United States Patent [19]

Lee et al.

[11] Patent Number: 5,221,706
[45] Date of Patent: Jun. 22, 1993

[54] TACKIFIABLE ACRYLIC EMULSION PRESSURE-SENSITIVE ADHESIVE HAVING EXCELLENT LOW-TEMPERATURE PERFORMANCE

[75] Inventors: Ivan S. P. Lee, Arcadia, Calif.; Paul Keller, Gottlieben, Switzerland; Richard J. Norman, Cramlington, United Kingdom; Robert S. Dordick, Lyndhurst, Ohio; Mary E. Zawadzki, Long Beach, Calif.

[73] Assignee: Avery Dennison Corporation, Pasadena, Calif.

[21] Appl. No.: 737,265

[22] Filed: Jul. 29, 1991

Related U.S. Application Data

[63] Continuation of Ser. No. 476,818, Feb. 7, 1990, abandoned.

[51] Int. Cl.$^5$ ................................. C08K 5/41
[52] U.S. Cl. .................... 524/156; 524/166; 524/272; 524/556
[58] Field of Search ............... 524/166, 272, 556, 156, 524/157

[56] References Cited

U.S. PATENT DOCUMENTS

| | | | |
|---|---|---|---|
| 3,677,991 | 7/1972 | Moore | 524/166 |
| 4,234,467 | 11/1980 | Ryrfors et al. | 526/87 |
| 4,529,762 | 7/1985 | Hoefer et al. | 524/166 |
| 4,925,908 | 5/1990 | Bernard et al. | 524/157 |

OTHER PUBLICATIONS

"McCutcheon's Detergents and Emulsifiers", 1976 International Edition, McCutcheon Div., McPublishing Co., Glen Rock, N.J. 1976, p. 2.

"McCutcheon's Emulsifiers and Detergents", 1982 North American Edition, McCutcheon Div., McPublishing Co., Glen Rock, N.J., 1982, pp. 51, 71, and 180.

*Primary Examiner*—Joseph L. Schofer
*Assistant Examiner*—R. H. Delmendo
*Attorney, Agent, or Firm*—Christie, Parker & Hale

[57] ABSTRACT

An emulsified pressure sensitive adhesive is provided which is based on a polymer containing from about 95 to 97.5% by weight of an alkyl ester of acrylic acid and from about 2.5 to 5% by weight of a mixture of carboxylic acids and a three component anionic surfactant system. The polymer is preferably tackified.

17 Claims, No Drawings

TACKIFIABLE ACRYLIC EMULSION PRESSURE-SENSITIVE ADHESIVE HAVING EXCELLENT LOW-TEMPERATURE PERFORMANCE

This is a continuation of application Ser. No. 07/476,818 filed Feb. 7, 1990, abandoned.

FIELD OF THE INVENTION

The present invention relates to pressure sensitive adhesives based on tacky emulsion polymers which are, as formed, useful as pressure-sensitive adhesives and receptive to tackification to form improved pressure sensitive adhesives. More particularly, the pressure sensitive adhesives of the instant invention have excellent low-temperature performance as well as adhesion to wet surfaces and to high and low energy surfaces.

BACKGROUND OF THE INVENTION

Pressure sensitive adhesives may be based on emulsion polymers. Some emulsion polymers are inherently tacky and function as pressure-sensitive adhesives, while others require tackification to achieve this end. It is desirable in offering a variety of products to provide emulsion polymers which are inherently tacky, but which also accept tackification to enable control in balancing adhesive properties.

It is also desirable for general purpose applications to provide an adhesive which bonds well to substrates of different surface energies over a broad range of end-use temperatures.

Such goals are realized by the practice of the instant invention.

SUMMARY OF THE INVENTION

According to the present invention, there is provided inherently tacky acrylic emulsion adhesive polymers having excellent adhesion to a wide variety of surfaces including polar, relatively high energy surfaces such as stainless steel; nonpolar, relatively low energy surfaces such as polyethylene; and difficult-to-bond surfaces such as corrugated cardboard. Moreover, peel adhesion at low temperatures and adhesion to wet surfaces is excellent and, when as part of a laminate stock such as pressure-sensitive adhesive label stock, provides excellent high-speed converting characteristics such as die cutting, matrix stripping and fan folding. In sum, the adhesive polymers are broad-based and serve to replace many solvent-based adhesives on an ecologically safe basis, as well as many emulsion-based adhesives, thus serving a variety of markets.

The inherently tacky emulsion pressure sensitive adhesives of the instant invention are based on polymers which contain, on an interpolymerized basis and based on the total weight of the polymer, about 95% to 97.5% of at least one alkyl ester of acrylic acid containing from about 1 to about 10 carbon atoms in the alkyl group, preferably butyl acrylate, 2-ethyl hexyl acrylate and mixtures thereof, and from about 2.5% to 5% of a mixture of unsaturated carboxylic acids containing from 3 to about 5 carbon atoms, preferably a mixture of acrylic and methacrylic acids in respective weight ratios of about 1:1 to about 1:3, preferably about 1:1 to about 1:2, the emulsion polymer preferably having a glass transition temperature of less than about $-10°$ C., and a gel content greater than about 50% by weight of the polymer. The emulsion adhesive polymers are provided in admixture with an anionic surfactant system comprising, based on the weight of surfactants and polymer, of from about 1% to 2% by weight of a sodium alkyl ether sulfate, about 0.1% to about 0.2% by weight of a sodium di-alkyl sulfosuccinate, and about 0.15% to 0.3% by weight of a disodium ethoxylated alkyl alcohol half ester of sulfosuccinic acid.

While the emulsified mixture of polymer and anionic surfactant system may be used as such, the mixture may be ideally tackified by the inclusion of dispersible tackifiers, preferably rosin or tall oil based. Ideally the tackifiers are provided in dispersion.

The amount of tackifier provided to the mixture will vary depending on the end use application, and will generally be present in an amount up to about 50% by weight based on the weight of the tackifier and polymer, preferably from about 20% to about 40% by weight.

The pressure sensitive emulsion systems of the present invention are adaptive to form smooth coatings which exhibit quick drying and a high tolerance for silicone contamination.

DETAILED DESCRIPTION

The present invention relates to pressure sensitive adhesive compositions which provide high adhesion to polar, nonpolar, and difficult-to-bond substrates with excellent shear properties. The adhesives moreover exhibit excellent adhesion to skin and wet surface as well as tolerance for silicone contamination. The adhesive polymers are emulsion polymers, i.e., prepared by emulsion polymerization; are used with an anionic surfactant system and optionally tackified. Tackification is preferably by combining with an aqueous dispersion of a water dispersible, compatible tackifier.

The pressure sensitive adhesives of the instant invention can be adapted to be used on almost any available face stock.

As compared to prior art acrylic pressure sensitive adhesives which do not give good adhesion to nonpolar surfaces such as polyolefins and certain other surfaces such as recycled corrugated cardboard, the pressure sensitive adhesives provided in accordance with the instant invention have excellent adhesion to both polyolefins and recycled corrugated cardboard and good low-temperature performance. The adhesives are most universal in their use, a result not heretofore achieved in single polymer emulsion pressure sensitive adhesives. Properties provided by the combination of polymers and anionic surfactant system enable high speed convertibility in label manufacture.

The emulsion based pressure sensitive adhesives of the instant invention are based on polymers which contain, on a percent by weight basis, from about 95% to about 97.5% by weight total of at least one alkyl ester of acrylic acid containing about 1 to about 10 carbon atoms in the alkyl group. Useful alkyl acrylates include n-butyl acrylate, 2-ethyl hexyl acrylate, isooctyl acrylate and the like. Butyl acrylate, 2-ethyl hexyl acrylate and mixtures thereof are preferred. Butyl acrylate is most preferred.

The second monomeric component is a mixture of $\alpha$, $\beta$ unsaturated carboxylic acids present in a total amount of at least about 2.5% by weight, preferably from about 2.5% to about 5% by weight.

The unsaturated carboxylic acid may contain from about 3 to about 5 carbon atoms and includes among others, acrylic acid, methacrylic acid, itaconic acid and the like. Mixtures of acrylic acid and methacrylic acid in a respective weight ratio of about 1:1 to about 1:3, preferably from about 1:1 to about 1:2.

Other monomers are not required to provide broad based emulsion adhesive systems but may be included. Styrenic monomers are, however, to be avoided.

Gel content or percent insolubles of the polymer are at least about 50% by weight and typically range from about 50% to about 65% by weight which provides excellent cohesive strength without internal cross-linking or the use of multifunctional monomers. In this regard, gel represents the amount of polymer which is insoluble in tetrahydrofuran expressed in percent by weight and determined by the membrane gel partitioning method. In this method, about 600 to 800 milligrams of 100% solid polymer is weighed onto a millipore membrane disk of 5 micrometer porosity. The disk is heat sealed and transferred to a scintillation vial. About 20 milliliters of tetrahydrofuran are added to the vial and the vial is rotated on a shaker for 16 to 24 hours. The sealed disk is then removed, washed with tetrahydrofuran, and dried first by placing it on a Whatman No. 1 filter paper, followed by exposure to 100° C. in the oven for a few hours. The dried disk is weighed and the insoluble portion of the polymer determined by the equation:

$$\text{Percent insoluble} = \frac{(b - c)}{a} \times 100 = \% \text{ gel}$$

wherein
a = total weight of 100% solids polymer
b = the weight of the polymer plus membrane before tetrahydrofuran treatment
c = polymer plus membrane remaining after tetrahydrofuran treatment.

The emulsion polymers have a glass transition temperature less than about −10° C., preferably less than about −30° C., and give, when combined with the anionic surfactant system, a good balance of adhesive properties at ambient and low temperatures. Properties are modified by tackification.

Polymers of the instant invention are prepared by emulsion polymerization under conditions of agitation in an autogenous atmosphere in the presence of suitable polymerization initiators such as water soluble persulfates. Chain transfer agents such as alkyl mercaptans can be employed. Electrolytes can be used to stabilize the emulsion. Solids content will vary depending upon the selected polymerization conditions. Polymerization conditions are desirably chosen to maintain grit levels low. Polymerization typically occurs under acid conditions and the emulsion formed is neutralized typically with ammonia to a final pH of from about 6 to about 6.5.

Polymers of the instant invention can be produced at a high solids level, at temperatures from 70° C. to 85° C., with use of an initial batch of monomers followed by addition of the balance of the monomers being added to the emulsion reaction system over a period of time.

The emulsion polymers are utilized and preferably formed in the presence of an anionic surfactant system present in an amount of from up to about 2.5% by weight based on the weight of the monomers and anionic surfactant system.

The principle anionic surfactant is present in a total amount of from about 1% to about 2% by weight of the mixture and is a sodium alkyl ether sulfate of the formula:

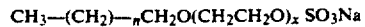

wherein n represents the number of —(CH$_2$)— groups normally in the range of about 6 to about 12 and x represents the number of repeating ethoxy groups normally in the range of 2 to about 30, preferably about 20 to about 30. The principal anionic surfactant is used in admixture with from about 0.1% to about 0.2% by weight of sodium dialkyl sulfosuccinate of the formula:

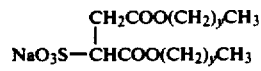

wherein y is independently the number of repeating —(CH$_2$)— groups in each alkyl group, typically in the range of about 6 to about 18, preferably about 7, and the like. The third anionic surfactant is present in an amount of from 0.2% to about 0.3% by weight and is a disodium ethoxylated alkyl alcohol half ester of an sulfosuccinic acid in which the alkyl group contains from about 10 to about 12 carbon atoms and the like.

The emulsified polymer-surfactant mixture can be used as such or tackified with a water dispersible tackifier that is compatible with the polymer. The presently preferred tackifiers are rosin ester based and/or tall oil ester based tackifiers present in an a amount of up to about 50% by weight, preferably from about 20% to about 40% by weight, based on the weight of the tackifier and polymer. Other tackifiers such as alkyl, aryl hydrocarbon and the like may also be used. Suitable tackifiers include, among others, the Snowtack family of and dispersed tackifiers sold by Tenneco; the Aquatac and Zonester dispersed tackifiers sold by Arizona Chemical Company; the Tacolyn and Piccovar dispersed tackifiers sold by Hercules; the Permatac dispersed tackifiers sold by Alliance Technical Products Ltd.; the Bervik dispersed tackifiers sold by a joint venture company formed by Arizona Chemical and Bervik Kemi of Sweden; and the like. Mixtures of tackifiers can be used. The surfactant system cooperates to enhance compatibility and processability of the emulsion, at high solids content, including coatability and leveling and performance characteristics such as low-temperature adhesion, wet stick, adhesion to skin and high cohesive strength even in the absence of internal cross-linking. The emulsified composition of this invention may be applied to a variety of face stocks and for labels and tapes by direct or transfer coating as is conventional in the art.

While nowise limiting, the following exemplify the properties of the emulsion adhesives of this invention.

EXAMPLES 1 TO 6

There was formed by emulsion polymerization an emulsified polymer containing, on an interpolymerized basis, about 97% by weight butyl acrylate, 1.2% by weight acrylic acid and 1.8% by weight methacrylic acid (Polymer 1). The emulsion contained about 0.12 part by weight of an anionic sodium dioctyl sulfosuccinate, 0.24 part by weight of an anionic disodium ethoxylated alcohol [C$_{10}$–C$_{12}$] half ester of sulfosuccinic acid, and 1.5 parts by weight anionic ethoxylated lauryl alcohol sodium sulfate containing about 25 ethylene oxide units per molecule per 100 parts by weight polymer. This formed a base emulsion of Polymer 1 which was utilized as such (Example 1) and when combined with tackifier dispersions, namely Hercules TACOLYN 64 an aqueous 50% solid solvent-free dispersion of a stabilized rosin ester (Example 2), Hercules FORAL 85-55, a 55% solids content anionic aqueous resin dispersion prepared from a glycerol ester of a highly hydrogenated rosin, (Example 3), PERMATAC E607, an emulsified esterified rosin (Example 4), a 50—50 blend of Arizona AQUATAC 6025, an aqueous dispersion of a low softening point rosin ester, and 6085, an aqueous dispersion of a glycerol ester of rosin, (Example 5), and mixture of SNOWTACK SE 325A, a gum rosin ester, and 380A, a gum rosin ester, (Example 6). Weight proportion of polymer to tackifier was about 75:25. The adhesion values to several surfaces at test temperatures shown are reported in TABLE 1 in which "PE" means polyethylene, "Cardboard" means recycled corrugated cardboard, Looptack and Peel are reported in N/m and Shear in minutes. Adhesive coat weight was about 25 g/m$^2$. Conditioning time for each test was 20 minutes of the temperature specified. The test methods or modifications thereof are those generally accepted in the art and published by the Pressure Sensitive Tape Council, American Society for Testing Materials and the like.

TABLE 1

| Substrate, Test | Ex 1 | Ex 2 | Ex 3 | Ex 4 | Ex 5 | Ex 6 |
|---|---|---|---|---|---|---|
| PE Film, Looptack @ 23° C. | — | 650 | 619 | 545 | 440 | 578 |
| PE Film, Looptack @ 5° C. | — | 850 | 320 | 790 | 480 | 732 |
| PE Film, Looptack @ −5° C. | — | 206 | 67 | — | 176 | 257 |
| Glass, Looptack @ 23° C. | 830 | 831 | 683 | 830 | 535 | 800 |
| Cardboard, Looptack @ 23° C. | 346 | 420 | 250 | — | 425 | 373 |
| Cardboard, Looptack @ 5° C. | 477 | 430 | 310 | — | 228 | 391 |
| PE Film, 90 degree Peel @ 23° C. | — | 522 | 235 | 363 | 255 | 472 |
| Cardboard, 90 degree Peel @ 23° C. | 280 | 225 | 320 | — | 410 | 403 |
| Shear ½" × ½", 500 g @ 23° C. | 173 | 30 | 81 | 20.3 | 7.8 | 30.5 |

EXAMPLES 7 TO 23

The Example 1 was repeated except that the emulsion was mixed in different proportions with various tackifiers. The tackifiers were Snowtack 301A (Ex. 8 to 11), PICOVAR AP-25-55W, an anionic dispersion of an alkylaryl hydrocarbon resin, (Ex. 12 to 15), PERMATAC E-607 (Ex. 16 to 19) and AQUATAC 6085, an aqueous dispersion of a glycerol ester of rosin, (Ex. 20 to 23). The various properties tested are shown in TABLES 2 to 5 below when coat weight was from 20 to 25 g/m$^2$ on 50 pound EDM uncoated litho paper facestock.

TABLE 2

| | Ex 7 | Ex 8 | Ex 9 | Ex 10 | Ex 11 |
|---|---|---|---|---|---|
| %, Polymer 1 | 100 | 96 | 88 | 76 | 57 |
| %, Tackifier | 0 | 4 | 12 | 24 | 43 |
| Peel Adhesion: 90 degree angle, 2 minute dwell, lb/in | | | | | |
| Glass | 1.25 | 1.15 | 1.00 | 1.20 | sft |
| HDPE Film | 1.25 | 1.10 | 1.15 | 1.20 | 1.65 |
| LDPE Panel | 0.95 | 0.85 | 0.93 | 1.05 | sft |
| Cardboard | 1.15 | 1.15 | 1.00 | 1.00 | 1.00 |
| Peel Adhesion: 90 degree angle, 24 hours dwell, lb/in | | | | | |
| Glass | 1.60 | 1.55 | 1.55 | 1.50 | 1.70 |
| HDPE Film | 1.43 | 1.50 | 1.60 | 1.93 | pft |
| LDPE Panel | 0.95 | 0.90 | 1.35 | 1.75 | ft |
| Cardboard | 1.45 | 1.40 | 1.20 | sft | pst |
| Loop Tack, lb/in | | | | | |
| Glass | 2.30 | 2.20 | 2.50 | 2.70 | 3.80 |
| HDPE Film | 2.18 | 2.20 | 2.25 | 2.45 | 3.05 |
| LDPE Panel | 1.05 | 1.15 | 1.25 | 1.70 | 2.30 |
| Cardboard | 1.70 | 1.70 | 1.55 | 1.60 | 1.75 |
| 500 gram, Shear, Min. | | | | | |
| | 76.7 | 30.9 | 42.2 | 21.8 | 17.7 |

HDPE - High density polyethylene
LDPE - Low density polyethylene
sft - Slight facestock tear
pst - partial facestock tear
ft - complete facestock tear

TABLE 3

| | Ex 12 | Ex 13 | Ex 14 | Ex 15 |
|---|---|---|---|---|
| % Polymer 1 | 96 | 87 | 74 | 55 |
| % Tackifier | 4 · | 13 | 26 | 45 |
| Peel Adhesion: 90 degree angle, 2 minute dwell, lb/in | | | | |
| Glass | 0.95 | 0.88 | 0.85 | 1.18 |
| HDPE Film | 1.00 | 0.95 | 0.95 | 1.10 |
| LDPE Panel | 0.90 | 0.85 | 0.75 | 0.75 |
| Cardboard | 1.00 | 0.90 | 0.75 | 0.75 |
| Peel Adhesion: 90 degree angle, 24 hours dwell, lb/in | | | | |
| Glass | 1.45 | 1.30 | 1.20 | 1.55 |
| HDPE Film | 1.45 | 1.15 | 1.15 | 1.50 |
| LDPE Panel | 1.65 | 1.30 | 0.90 | 0.85 |
| Cardboard | 1.35 | 1.20 | 1.15 | 1.30 |
| Loop Tack, lb/in | | | | |
| Glass | 2.40 | 2.08 | 1.95 | 2.75 |
| HDPE Film | 1.63 | 1.65 | 1.50 | 1.70 |
| LDPE Panel | 1.00 | 1.10 | 1.00 | 0.98 |
| Cardboard | 1.30 | 0.80 | 0.90 | 0.70 |
| 500 gram, Shear, Min. | | | | |
| | 45.3 | 41.6 | 35.7 | 8.8 |

TABLE 4

| | Ex 16 | Ex 17 | Ex 18 | Ex 19 |
|---|---|---|---|---|
| % Polymer 1 | 96 | 88 | 76 | 57 |
| % Tackifier | 4 | 12 | 24 | 43 |
| Peel Adhesion: 90 degree angle, 2 minute dwell, lb/in | | | | |
| Glass | 1.05 | 1.00 | 1.20 | 1.30 |
| HDPE Film | 1.03 | 1.13 | 1.30 | sft |
| LDPE Panel | 0.70 | 0.80 | 1.00 | sft |
| Cardboard | 1.40 | .95 | 1.00 | st |
| Peel Adhesion: 90 degree angle, 24 hours dwell, lb/in | | | | |
| Glass | 1.15 | 1.15 | 1.35 | pft |
| HDPE Film | 1.40 | 1.40 | pft | ft |
| LDPE Panel | 0.95 | 1.00 | 1.20 | pft |
| Cardboard | st | st | st | st |
| Loop Tack, lb/in | | | | |
| Glass | 2.00 | 2.03 | 2.40 | sft |
| HDPE Film | 2.05 | 2.13 | 2.60 | 3.35 |
| LDPE Panel | 1.50 | 1.83 | 2.40 | 2.95 |
| Cardboard | 1.55 | 1.20 | 1.30 | 1.60 |
| 500 gram, Shear, Min. | | | | |
| | 59.0 | 30.4 | 25.2 | 13.0 · | st = substrate tear

TABLE 5

| | Ex 20 | Ex 21 | Ex 22 | Ex 23 |
|---|---|---|---|---|
| % Polymer 1 | 94.9 | 84.7 | 71.1 | 49.9 |
| % Tackifier | 5.1 | 15.3 | 28.9 | 51.1 |
| Peel Adhesion: 90 degree angle, 2 minute dwell, lb/in | | | | |
| Glass | 1.30 | 1.43 | pft | ft |
| HDPE Film | 1.00 | 1.28 | pft | ft |
| LDPE Panel | 0.88 | 1.25 | pft | ft |
| Cardboard | 0.80 | 0.85 | 1.00 | 0.70 |
| Peel Adhesion: 90 degree angle, 24 hours dwell, lb/in | | | | |
| Glass | 0.80 | sft | pft | ft |
| HDPE Film | sft | sft | pft | ft |
| LDPE Panel | 1.30 | 1.80 | pft | ft |
| Cardboard | 1.45 | 1.55 | 1.20 | 1.20 |
| Loop Tack, lb/in | | | | |
| Glass | 3.20 | 3.35 | pft | ft |
| HDPE Film | 2.20 | 2.70 | sft | ft |
| LDPE Panel | 1.55 | 1.80 | 2.85 | 1.95 |
| Cardboard | 2.05 | 2.20 | 2.50 | 1.50 |
| 500 gram, Shear, Min. | | | | |
| | 161.2 | 183.8 | 154.3 | 148.4 |

What is claimed is:

1. An aqueous pressure sensitive adhesive emulsion comprising:
   (a) an inherently tacky polymer having a glass transition temperature less than about $-10°$ C. and a gel content greater than about 50% by weight and consisting essentially of:
      i. at least one alkyl ester of acrylic acid containing from 1 to about 10 carbon atoms in the alkyl group, the total of alkyl ester present in an amount of from about 95% to about 97.5 by weight of the polymer, and
      ii. a mixture of $\alpha, \beta$ ethylenically unsaturated carboxylic acids present in a total amount of from about 2.5% to about 5% by weight of the polymer; and
   (b) an anionic surfactant system comprising based on the total weight of the anionic surfactant system and polymer of:
      i. from about 1% to about 2% by weight of a sodium alkyl ether sulfate of the formula:

$$CH_3-(CH_2)_n-CH_2O(CH_2CH_2O)_xSO_3Na$$

wherein n is from about 6 to about 12 and x is from about 2 to about 30,
      ii. from about 0.15% to about 0.3% by weight, of disodium ethoxylated alkyl alcohol half ester of sulfosuccinic acid, and
      iii. from about 0.1% to about 0.2% to about 0.2% by weight of a sodium dialkyl sulfosuccinate of the formula:

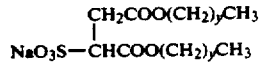

wherein each y independently has a value of from about 6 to about 18.

2. A pressure sensitive adhesive emulsion as claimed in claim 1 in which the alkyl ester of acrylic acid is selected from the group consisting of 2-ethyl hexyl acrylate, butyl acrylate and mixtures thereof.

3. A pressure sensitive adhesive emulsion as claimed in claim 1 where the mixture of ethylenically unsaturated acids are a mixture of acrylic acid and methacrylic acid provided at a weight ratio of acrylic acid to methacrylic acid of about 1:1 to about 1:3.

4. A pressure sensitive adhesive emulsion as claimed in claim 2 where the mixture of ethylenically unsaturated acid is a mixture of acrylic acid and methacrylic acid provided at a weight ratio of acrylic acid to methacrylic acid of about 1:1 to about 1:2.

5. A pressure sensitive adhesive emulsion as claimed in claim 1 in which the adhesive is tackified by the addition of a compatible tackifier present in an amount up to about 50% by weight based on the weight of the polymer and the tackifier.

6. A pressure sensitive adhesive emulsion claimed in claim 5 in which the tackifier is selected from the group consisting of rosin esters, tall oil esters and mixtures thereof.

7. A pressure sensitive adhesive emulsion as claimed in claim 2 in which the adhesive is tackified by the addition of a compatible tackifier present in an amount up to about 50% by weight based on the weight of the polymer and the tackifier.

8. A pressure sensitive adhesive emulsion claimed in claim 7 in which the tackifier is selected from the group consisting of rosin esters, tall oil esters and mixtures thereof.

9. A pressure sensitive adhesive emulsion as claimed in claim 4 in which the adhesive is tackified by the addition of a compatible tackifier present in an amount up to about 50% by weight based on the weight of the polymer and the tackifier.

10. A pressure sensitive adhesive emulsion claimed in claim 9 in which the tackifier is selected from group consisting of rosin esters, tall oil esters and mixtures thereof.

11. An aqueous pressure sensitive adhesive emulsion comprising:
    (a) an inherently tacky emulsion polymer having a glass transition temperature less than about $-10°$ C. and a gel content greater than about 50% by weight and consisting essentially of:
       i. at least one alkyl ester of acrylic acid containing from 1 to about 10 carbon atoms in the alkyl group, the total alkyl ester present in a total amount of from about 95% to about 97.5% by weight of the polymer, and
       ii. a mixture of acrylic acid and methacrylic acid present in a total amount of from about 2.5% to about 5% by weight of the polymer and wherein a weight ratio of acrylic acid to methacrylic acid of about 1:1 to about 1:3;
    (b) an anionic surfactant system comprising, based on the weight of the anionic surfactant system and polymer, of:
       i. from about 1% to about 2% by weight of a sodium alkyl ether sulfate of the formula:

$$CH_3-(CH_2)-_nCH_2O(CH_2CH_2O)SO_3Na$$

wherein n is from 6 to about 12 and x is from about 20 to about 30,
       ii. from about 0.15% to about 0.3% by weight, disodium ethoxylated alkyl alcohol half ester of sulfosuccinic acid wherein the alkyl group contains from 10-12 carbon atoms, and
       iii. from about 0.1% about 0.2% by weight, of a sodium dialkyl sulfosuccinate of the formula:

$$\text{NaO}_3\text{S}-\overset{\overset{\displaystyle \text{CH}_2\text{COO}(\text{CH}_2)_y\text{CH}_3}{|}}{\text{CHCOO}(\text{CH}_2)_y\text{CH}_3}$$

wherein each y is independently from about 6 to about 18; and (c) a water dispersible, compatible tackifier present in an amount of from 0 to about 50 parts by weight based on the weight of the polymer and tackifier.

12. A pressure sensitive adhesive emulsion as claimed in claim 11 in which the alkyl ester of acrylic acid is butyl acrylate.

13. A pressure sensitive adhesive emulsion claimed in claim 11 in which the tackifier is selected from the group consisting of rosin esters, tall oil esters and mixtures therefor.

14. A pressure sensitive adhesive emulsion as claimed in claim 12 where the mixture of acrylic acid and methacrylic acid is provided at a weight ratio of acrylic acid to methacrylic acid of about 1:1 to about 1:2.

15. An aqueous pressure sensitive adhesive emulsion comprising:
(a) an inherently tacky pressure sensitive adhesive polymer having a glass transition temperature less than about $-10°$ C. and a gel content greater than about 50% by weight and comprising butyl acrylate and from about 2.5 to about 5% by weight of a mixture of $\alpha, \beta$ ethylenically unsaturated carboxylic acids;
(b) an anionic surfactant system comprising based on the total weight of the anionic surfactant system and polymer of:
i. from about 1% to about 2% by weight, a sodium alkyl ether sulfate of the formula:

$$\text{CH}_3-(\text{CH}_2)_n-\text{CH}_2\text{O}\,(\text{CH}_2\text{CH}_2\text{O})_n\text{SO}_3\text{Na}$$

wherein n is from about 6 to about 12 and x is from about 2 to about 30,
ii. from about 0.15% to about 0.3% by weight, and disodium ethoxylated alkyl alcohol half ester of sulfosuccinic acid,
iii. from about 0.1% to about 0.2% by weight of sodium dialkyl sulfosuccinate of the formula:

$$\text{NaO}_3\text{S}-\overset{\overset{\displaystyle \text{CH}_2\text{COO}(\text{CH}_2)_y\text{CH}_3}{|}}{\text{CHCOO}(\text{CH}_2)_y\text{CH}_3}$$

wherein each y independently has a value from about 6 to about 18, and
(c) a water dispersible tackifier for said polymer, said tackifier present in a positive amount up to about 50% by weight based on the weight of the tackifier and polymer.

16. An aqueous pressure sensitive adhesive emulsion comprising:

(a) an inherently tacky pressure sensitive adhesive polymer having a glass transition temperature less than abut $-10°$ C. and a gel content greater than abut 50% by weight and comprising an alkyl acrylate selected from the group consisting of butyl acrylate and mixture of butyl acrylate and 2-ethylhexyl acrylate, and a mixture of acrylic acid and methacrylic acids present in an total amount of from about 2.5% to about 5% by weight of the polymer in which the weight ratio of acrylic acid to methacrylic acid is from about 1:1 to about 1:3;
(b) an anionic surfactant system comprising based on the total weight of the anionic surfactant system and polymer of:
i. from about 1% to about 2% by weight of a sodium alkyl ether sulfate of the formula:

$$\text{CH}_3-(\text{CH}_2)_n-\text{CH}_2\text{O}\,(\text{CH}_2\text{CH}_2\text{O})_x\text{SO}_3\text{Na}$$

wherein n is from about 6 to about 12 and x is from about 2 to about 30,
ii. from about 0.15% to about 0.3% by weight, and disodium ethoxylated alkyl alcohol half ester of sulfosuccinic acid,
iii. from about 0.1% to about 0.2% by weight of sodium dialkyl sulfosuccinate of the formula:

$$\text{NaO}_3\text{S}-\overset{\overset{\displaystyle \text{CH}_2\text{COO}(\text{CH}_2)_y\text{CH}_3}{|}}{\text{CHCOO}(\text{CH}_2)_y\text{CH}_3}$$

wherein each y independently has a value from about 6 to about 18, and
(c) a water dispersible tackifier selected from the group consisting of a rosin ester tackifier, and tall oil tackifiers and mixtures thereof present in a positive amount up to 50% by weight of the total weight of tackifier and polymer.

17. An aqueous pressure sensitive adhesive emulsion comprising:
(a) about 76 parts by weight an inherently tacky pressure sensitive adhesive polymer having a glass transition temperature less than abut $-10°$ C. and a gel content greater than about 50% by weight and comprising about 97% by weight of butyl acrylate and about 1.7% by weight acrylic acid and about 1.8 per cent by weight methacrylic acid;
(b) for each 100 parts by weight polymer, an anionic surfactant system comprising:
i. about 1.5 parts by weight of an ethoxylated lauryl alcohol sodium sulfate containing about 25 ethylene oxide units per molecule,
ii. about 0.24 part by weight of disodium ethoxylated alcohol half esters of sulfosuccinate and,
iii. about 0.12 part by weight of sodium dioctyl sulfosuccinate, and
(c) about 24 parts by weight of a water dispersible rosin ester tackifier.

* * * * *

UNITED STATES PATENT AND TRADEMARK OFFICE
CERTIFICATE OF CORRECTION

PATENT NO. : 5,221,706

DATED : June 22, 1993

INVENTOR(S) : Ivan S.P. Lee; Paul Keller; Richard J. Norman; Robert S. Dordick; Mary E. Zawadzki It is certified that error appears in the above-identified patent and that said Letters Patent is hereby corrected as shown below:

Column 3, line 38, change "-10 ° C" to -- -10°C --.
Column 4, line 22, before "sulfosuccinic" change "an" to -- a --.
Column 4, line 29, before "amount" delete "a".
Column 4, line 35, before "dispersed" delete "of and".
Column 5, line 60, change "Snowtack" to -- SNOWTACK --.

Column 8, line 32, before "group" insert -- the --.
Column 8, line 67, before "about" insert -- to --.
Column 9, line 17, after "mixtures" change "therefor" to -- thereof --.
Column 10, lines 3,4,43, change "abut" to -- about -- (all occurrences).
Column 10, line 6, before "mixture" insert -- a --.
Column 10, line 8, before "total" change "an" to -- a --.
Column 10, line 40, after "weight" insert -- of --.
Column 10, line 43, change "abut" to -- about --.

Signed and Sealed this

Twenty-ninth Day of March, 1994

Attest:

BRUCE LEHMAN

*Attesting Officer*    *Commissioner of Patents and Trademarks*